3,179,665
9-(N-ETHYL AND N-PROPYL PIPERIDYL-3'-METHYL)-THIOXANTHENES
Jean Schmutz, Bern, Switzerland, assignor to Dr. A. Wander, S.A., Bern, Switzerland, a corporation of Switzerland
No Drawing. Filed Dec. 17, 1959, Ser. No. 860,078
4 Claims. (Cl. 260—293.4)

This invention relates generally to new thioxanthene derivatives and to novel methods of preparing said derivatives. More particularly, the present invention relates to novel 9-(N-alkyl-piperidyl-alkyl)-thioxanthene compounds and 2-substituted-9-(N-alkyl-piperidyl-alkyl)thioxanthene compounds and to methods of producing said compounds.

In my U.S. Patent No. 2,905,590 the novel compound 9-(N-methyl-piperidyl-3-methyl)-thioxanthene having anti-Parkinson activity and acid salts thereof are disclosed. It has now been discovered that other thioxanthene derivatives in addition to 9-(N-methyl-piperidyl-3-methyl)-thioxanthene and acid salts thereof have anti-Parkinson activity and moreover central antidepressant activity and are therefore useful as therapeutic agents. Thus, the novel thioxanthene compounds of the present invention are defined generally as the bases having the following structural formula:

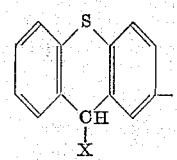

wherein X is a N-alkyl-piperidyl-alkyl group having the following general formula:

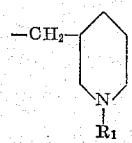

wherein $R_1$ is an alkyl group having two to three carbon atoms; and the acid addition salts of the foregoing compounds.

The 9-(N-alkyl-piperidyl-3-methyl)-thioxanthenes described above are organic bases which can be reacted with acids to form readily water-soluble salts useful for oral or parenteral therapy. Although the free bases are the source of the pharmacological utility of the compounds, it is generally more convenient to employ the salts, particularly the hydrochlorides and the tartrates. The salts are formed by well-known techniques, e.g., by neutralising an ether or alcohol solution of the bases with an acetone or alcohol solution of the desired acid and recrystallising the resultant salts from a water-acetone or an alcohol-ether solution. In forming salts of inorganic acids, it is preferred to employ hydrochloric acid, sulfuric acid, or phosphoric acid. Among the organic acids which can be used for forming salts with good results are acetic acid, maleic acid, tartaric acid and citric acid.

The new compounds described above can be employed in the usual forms for therapeutic administration. For example, the active substances may be combined with a suitable pharmaceutical carrier to provide solutions, syrups, tablets, capsules, dragees, suppositories, powders, or the like. The dosage unit form may contain from about five to one hundred mg. of the active substance. For example, in the case of solutions for injection, the ampoule may contain, by way of illustration, 0.5 to 2% solution with twenty to fifty mg. of active substance per ampoule. For infusion, the ampoule may contain a 2 to 3% solution with fifty to one hundred mg. of active substance per ampoule. In the case of tablets or the like the dosage of active substance may be five to fifty mg. and for suppositories twenty to one hundred mg. Pharmacological actions exhibited by certain of the 2-thioxanthene derivatives of the present invention, such as 2-methoxy derivatives, show a marked improvement over the compounds of the prior art and require smaller dosage levels to effect comparable therapeutic results.

The synthesis of the new compounds of the present invention is carried out most conveniently by first metallising the thioxanthene in the 9 position and then reacting the resultant metallo-thioxanthene compound with an ester of an alcohol having a formula:

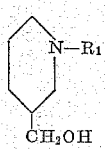

wherein $R_1$ has the same meaning as above defined, and especially an ester thereof and a hydrohaloic acid, such as hydrochloric or hydrobromic acid, or of an aryl sulfonic acid, particularly benzene sulfonic acid or p-toluene sulfonic acid. The resulting esters of the foregoing alcohols have the following general formula:

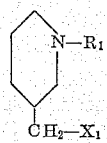

wherein $R_1$ has the aforementioned values and $X_1$ represents a halogen molecule, especially chlorine or bromine, or an alkyl sulfonate, particularly benzene sulfonate or p-toluene sulfonate. The reaction is preferably carried out in an inert solvent such as benzene, toluene, dioxane, anisole, etc. The preferred metallising agents are the alkali metal compounds such as aryl sodium, particularly phenyl sodium and tolyl sodium, sodium amide, aryl lithium, alkyl lithium etc. Usually, phenyl sodium, tolyl sodium, and sodium amide will be used because of their relative cheapness and availability. Both reactions can be carried out simultaneously if desired, i.e., the thioxanthene, the metallising agent and the ester can all be reacted together.

A further method of preparation of the new compounds of the present invention consists in hydrogenating a compound of the general formula represented by the following formula:

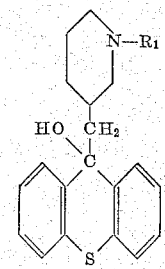

wherein $R_1$ has the same meaning as above defined. If desired, a dehydration product of the foregoing 9-hydroxy compounds can be used in place of the 9-hydroxy compound. The hydrogenation reaction can be carried out with nascent hydrogen, preferably by the use of sodium and an alcohol, or by catalytically hydrogenating. The 9-hydroxy thioxanthene starting material of this method can be produced by reacting a suitably substituted thioxanthene with a 1-alkyl-piperidino-3-methyl-metallo compound, for instance with a Grignard compound, according to known methods.

The following specific examples illustrate methods of preparation of the compounds of the present invention but should not be construed to restrict the invention to the particular reactants or proportions employed.

EXAMPLE 1

9-(1'-ethyl-piperidyl-3'-methyl)-thioxanthene

To a sodium dispersion of 4.9 gm. of finely pulverised sodium in 50 ml. of absolute benzene is added dropwise with stirring 12 gm. of chlorobenzene in 50 ml. of absolute benzene. As soon as the exothermic reaction begins, the temperature is maintained between 30 and 35° C. by cooling, and stirring is continued for two to three hours.

To the resulting phenyl sodium solution is added dropwise 19.8 gm. of thioxanthene in 120 ml. of absolute benzene. The slightly exothermic reaction ceases after about one to one-hand-a-half hours.

To the latter freshly prepared 9-thioxanthyl sodium solution is added dropwise with stirring and cooling, 13.5 gm. of N-ethyl-3-chloro-methyl-piperidine in thirty to forty ml. of absolute benzene. The reaction solution is stirred at about 25° C. for one-and-a-half hours, and then heated to 40° C. for one hour. The resulting mixture is decomposed by adding carefully a small amount of water, and the newly formed base is extracted from the benzene solution by means of dilute hydrochloric acid. The aqueous hydrochloric acid solution is made alkaline by adding dilute sodium hydroxide, and the thioxanthene base is isolated by extraction with ether. A yield of 22.1 grams of a slightly yellow, viscous base, 9-(1'-ethyl-piperidyl-3'-methyl)-thioxanthene, having a boiling point of 175 to 178° C./0.07 mm. is obtained.

EXAMPLE 2

9-(1'-propyl-piperidyl-3'-methyl)-thioxanthene

By following the same procedure as in Example 1, but using instead of the N-ethyl-3-chloromethyl-piperidine, 13.9 gm. N-propyl-3-chloromethyl-piperidine, a yield of 22.0 gm. of the base, 9-(1'-propyl-piperidyl-3'-methyl)-thioxanthene, is obtained, said base having a boiling point of 178 to 181° C./0.07 mm.

EXAMPLE 3

9-(1'-ethyl-piperidyl-3'-methyl)-thioxanthene hydrochloride salt

An ether solvent solution of 9-(1'-ethyl-piperidyl-3'-methyl)-thiocanthene is neutralized with an alcoholic solution of hydrogen chloride to form the 9-(1'-ethyl-piperidyl-3'-methyl)-thioxanthene hydrogen chloride salt which is crystallised upon addition of ether to give the said salt in the form of colourless, prismatic crystals, said salt exhibiting a melting point of 197 to 199° C.

EXAMPLE 4

9-(1'-propyl-piperidyl-3'-methyl)-thioxanthene hydrochloride salt

By following the same procedure as in Example 3, but using instead of the 9-(1'-ethyl-piperidyl-3'-methyl)-thioxanthene 9-(1'-propyl-piperidyl-3'-methyl)-thioxanthene, the corresponding hydrochloride salt is obtained in the form of colourless, prismatic crystals, said salt exhibiting a melting point of 203 to 206° C.

EXAMPLE 5

9-(1'-ethyl-piperidyl-3'-methyl)-thioxanthene

Thioxanthene is reacted with 1-ethyl-piperidino-3-methyl magnesium chloride according to known methods (cf. A. Marker, Helv. Chim. Acta 24E, 209 (1941)) to form 9-(1'-ethyl-piperidino-3'-methyl)-thioxanthenol-(9). Ten parts of the crude product are dissolved in two hundred parts of propanol. The solution is heated to gentle reflux, and five parts of sodium chips are added in small increments with stirring. After the sodium is completely added, the solvent is removed by distillation. The residue is combined with water and extracted with ether. After evaporation of the solvent, the residue is distilled in vacuo. A viscous alkaline product comprising the base, 9-(1'-ethyl-piperidyl-3'-methyl)-thioxanthene, having the boiling point 175 to 178° C./0.07 mm. is obtained in a yield of 85 to 90%. Upon acidification with alcoholic hydrochloric acid and addition of ether (1:2) the hydrochloride addition salt of said base crystallises in colourless prisms, said salt having a melting point 197 to 199° C.

It will be understood by those skilled in the art that where it is desired to produce a compound wherein $R_1$ consists of an alkyl group other than ethyl, such as propyl, one uses in place of the 9-(1'-ethyl-piperidino-3'-methyl)-thioxanthenol-(9) the compound 9-(1'-propyl-piperidino-3'-methyl)-thioxanthenol-(9), said latter compound being formed in the same manner but using the appropriate 1-alkyl substituted piperidino-3-methyl magnesium chloride compound.

I claim:
1. The compound 9-(1'-ethyl-piperidyl-3'-methyl)-thioxanthene.
2. The compound 9-(1'-propyl-piperidyl-3'-methyl)-thioxanthene.
3. A non-toxic pharmaceutically acceptable acid addition salt of 9-(1'-ethyl-piperidyl-3'-methyl)-thioxanthene.
4. A non-toxic pharmaceutically acceptable acid addition salt of 9-(1'-propyl-piperidyl-3'-methyl)-thioxanthene.

References Cited in the file of this patent

UNITED STATES PATENTS

| | | |
|---|---|---|
| 2,368,006 | Cusic | Jan. 23, 1945 |
| 2,627,518 | Archer | Feb. 3, 1953 |
| 2,905,590 | Schmutz | Sept. 22, 1959 |
| 2,951,082 | Sprague et al. | Aug. 30, 1960 |

FOREIGN PATENTS

| | | |
|---|---|---|
| 1,209,059 | France | Sept. 21, 1959 |